United States Patent

Fredlund et al.

Patent Number: 5,986,671
Date of Patent: Nov. 16, 1999

[54] METHOD OF COMBINING TWO DIGITALLY GENERATED IMAGES

[75] Inventors: John R. Fredlund; Ronald S. Cok, both of Rochester, N.Y.

[73] Assignee: Eastman Kodak Company, Rochester, N.Y.

[21] Appl. No.: 08/843,673

[22] Filed: Apr. 10, 1997

[51] Int. Cl.[6] .................................................... G06F 17/21
[52] U.S. Cl. ......................................... 345/435; 395/117
[58] Field of Search ............................. 395/117; 345/435

[56] References Cited

U.S. PATENT DOCUMENTS

| | | | |
|---|---|---|---|
| 5,146,548 | 9/1992 | Bijnagte | 395/117 |
| 5,459,819 | 10/1995 | Watkins et al. | 395/117 |
| 5,485,554 | 1/1996 | Lowitz et al. | 395/116 |
| 5,530,793 | 6/1996 | Watkins et al. | 395/117 |

FOREIGN PATENT DOCUMENTS

| | | | |
|---|---|---|---|
| 2180427 | 3/1987 | United Kingdom | H04N 1/100 |
| 2246929 | 1/1992 | United Kingdom | H04N 1/387 |

*Primary Examiner*—James P. Trammell
*Assistant Examiner*—John L. Young
*Attorney, Agent, or Firm*—Frank Pincelli

[57] ABSTRACT

A method of combining at least one captured generated digital image and a prestored digital image. The method includes providing a customer generated image in digital form; automatically determining the aspect ratio of the selected customer generated image; providing a plurality of prestored digital images, each having a predetermined location wherein the customer generated digital image may be placed, the location of each of the plurality of prestored digital images having a different predetermined size aspect ratio; and automatically selecting one of the prestored digital images wherein the location has an aspect ratio closest to the aspect ratio of the selected customer generated image.

18 Claims, 10 Drawing Sheets

METHOD OF COMBINING TWO DIGITALLY GENERATED IMAGES

FIELD OF THE INVENTION

The present invention is directed to a system and method for producing customized images by merging at least two images obtained from different sources and printing the images on at least one output format.

BACKGROUND OF THE INVENTION

It is known from U.S. Pat. No. 5,459,819 to combine a customer generated digital image with a prestored digital image having a predetermined location for receiving the customer generated image so as to form a single merged digital image. A customer generated image may have a variety of different aspect ratios which may be due to the original format of the image, or due to the manner in which the image was obtained, for example, segregating a particular portion of an image from a larger image. Thus, the aspect ratio of the customer generated image may not be suitable or complement the artistic effect of the prestored digital image it is to be combined with. While manual adjustment to the customer generated image or to the prestored image can be made, this results in adding significant operator time for modifying the image and further cost to the purchaser.

Thus, there is a problem in merging images in a quick and cost-effective manner without substantially affecting the desired aesthetic effect of the merged image when the aspect ratio of the customer generated image does not properly match the location in which it is desired to be placed.

Applicants have solved this problem by providing a system wherein a plurality of substantially identical prestored images are provided, each having a location of a different aspect ratio for receiving the customer generated digital image. The system includes a computer which automatically selects the appropriate prestored image and makes any appropriate modifications to the prestored image without affecting overall artistic effect of the selected prestored image.

SUMMARY OF THE INVENTION

A method of combining at least one captured generated digital image and a prestored digital image, comprising the steps of:

a) providing a customer generated image in digital form;

b) automatically determining the aspect ratio of the selected customer generated image;

c) providing a plurality of prestored digital images, each having a predetermined location wherein the customer generated digital image may be placed, the location of each of the plurality of prestored digital images having a different predetermined size aspect ratio; and d) automatically selecting one of the prestored digital images wherein the location has an aspect ratio closest to the aspect ratio of the selected customer generated image.

In accordance with another aspect of the present invention, there is provided a method of combining at least one captured generated digital image with a prestored digital image, comprising the steps of:

a) selecting a prestored digital image, the prestored digital image having a predetermined location of a predetermined aspect ratio wherein a captured generated digital image may be placed, the prestored image having an area around the location that can be removed in order to accommodate a customer generated image having an aspect ratio greater than the predetermined ratio;

b) providing at least one capture means for obtaining a customer generated image in digital form;

c) providing at least one output means for printing, displaying, transmitting, or storing of an image;

d) automatically modifying the aspect ratio of the location so as to correspond to the aspect ratio of the customer generated image;

e) combining the modified prestored digital image with the customer generated image so as to form a merged digital image; and f) forwarding the merged image to an output device.

In yet another aspect of the present invention, there is provided a method of combining at least one captured generated digital image with a prestored digital image, comprising the steps of:

a) providing a customer generated digital image;

b) automatically determining the aspect ratio of the selected customer generated digital image;

c) automatically selecting a prestored digital image based on the aspect ratio of the customer generated image, the prestored digital image having a predetermined location of a predetermined aspect ratio wherein the customer generated digital image may be placed, the prestored image having a buffer area around the location that can be removed or overwritten in order to accommodate the customer generated image; and d) automatically modifying the buffer area so that the location of the selected prestored digital image corresponds to the aspect ratio of the selected customer generated image.

DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
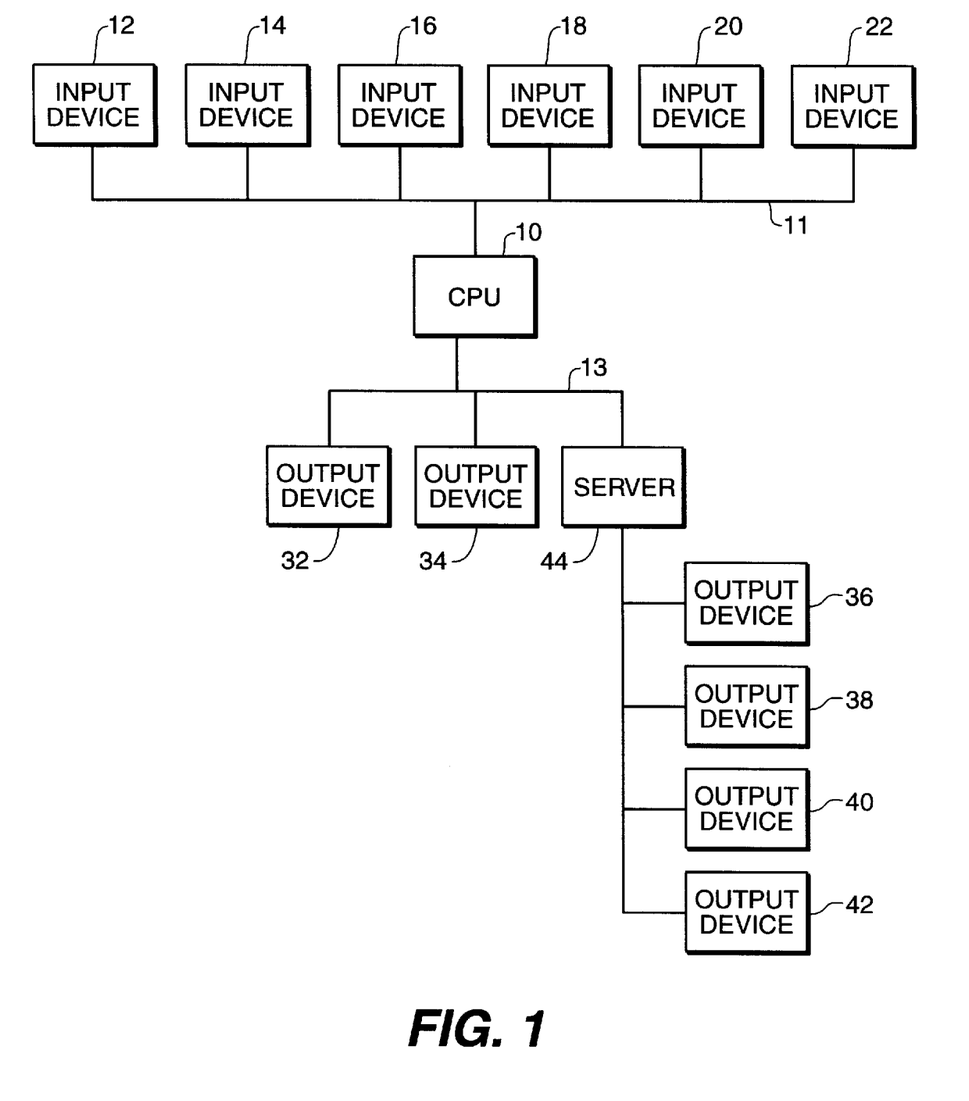
FIG. 1 is a schematic block diagram of a system made in accordance with the present invention.

Referring to FIG. 1, there is illustrated in block diagram form a system for producing customized images and imprinting these customized images onto a variety of different formats. In particular, the system includes a central processing unit (CPU) 10 which can take the form of any appropriate computer. In the particular embodiment illustrated, the central processing unit 10 comprises an APPLE MACINTOSH COMPUTER which is used to control the various input and output devices. A plurality of input devices 12,14,16,18,20,22 are provided for generating an image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output which is forwarded onto the central processing unit 10 by an appropriate data link system 11 for storage in memory and further manipulation. Likewise, input device 14 is provided for scanning of photographic pictures, printed or drawn, both color and/or monochrome, and producing a digitized signal which is representative of the image scanned. The COLOREDGE Printer, sold by the Eastman Kodak Company, has a scanner built therein which is capable of scanning photographic pictures, or any type printed material, and providing the appropriate digital signal for the CPU 10. The second input device 14 is appropriately connected to the CPU 10, such that the CPU 10 may appropriately receive and manipulate the information obtained therefrom. Likewise, input devices 16,18,20,22 are provided for obtaining digital signals representative of an image from various sources. In particular, input device 16 is a video camera designed to obtain images, and input device 18 comprises a CD (compact disc) reader for reading digitally stored information on a compact disc. Input device 20 comprises an electronic camera, such as the DCS 200 Digital Camera, produced by the Eastman Kodak Company. Input device 22 may be any other input device which is capable of providing a digital signal representative of an image to the CPU 10, for example, video tape and video laser disc.

The CPU 10 is also connected to a variety of output devices 32,34,36,38,40,42. These output devices are all appropriately connected to the central processing unit 10 by an appropriate data link system 13 as is well known in the prior art. For example, but not by way of limitation, by an Ethernet data link system. The output device 32, for instance, comprises an electrophotographic printer, such as the KODAK IMAGE MAGIC Heavy Stock Printer, sold by the Eastman Kodak Company, which takes the digital image and transfers the image onto media which can then be used to produce transfers for use on garments. The output device 34, in the embodiment illustrated, is a cathode-ray tube printer (CRT), in particular, the PCD 600 Printer, produced by the Eastman Kodak Company, which takes an image that is displayed on a cathode-ray tube and focuses it onto a photographic paper. Also provided is a thermal printer 36 for printing images onto thermal media. An example of a suitable thermal printer is the XLS 8600 Digital Thermal Color Printer, sold by the Eastman Kodak Company. In particular, printer 38 can be a thermal printer for providing transfers for use on T-shirts, whereas thermal printer 40 can be used for providing transfers for placement on mugs. The last output device 42 illustrated is an inkjet printer which can be used to imprint the merged image on greeting cards and the like. Various other devices may be provided for transferring onto various other formats such as garments, mugs, posters, banners, life-size cut-outs, holographic and 3-D imaging, balloons, pens, and pencils.

In the preferred embodiment illustrated, a server 44, such as the POWER PC APPLE MACINTOSH Computer, is used for managing information from the CPU 10 and for appropriately providing information to the various printing devices associated therewith. Likewise, if so desired, additional computers may be provided in association with each of the input or output devices for managing information and providing further customizing features as deemed appropriate. For a more simplified system, the input and output devices may all be connected to a single computer. Also, it is to be understood that any type suitable printing device may be employed for producing the image in the desired format, the present invention not being limited by the printing devices described herein.

It is to be understood that the CPU 10 may be provided with a monitor for viewing various screens for indicating the status of the system and available options for controlling and/or operating the system as is customarily done in the prior art. The CPU 10 is also provided with an appropriate input device such as a keyboard, touchscreen, or pointing device, as are well known in the prior art, for allowing the operator to properly operate the system. Thus, the user, which may be the operator and/or customer, can also view the various images being input into the system and generated by the system so that the appropriate selections can be made by the user and/or customer. In the CPU 10 there is stored a plurality of prestored images which may comprise a variety of artistic themes having at least one location for receiving a customer generated digital image. Any one of these prestored images may be selected and digitally merged with the customer generated image(s) captured by any of the input devices 12,14,16,16,20,22.

A more detailed description of the operation of the system as disclosed in FIG. 1 is described in U.S. Pat. No. 5,459,819, which is hereby incorporated by reference in its entirety.

Figure 2A:
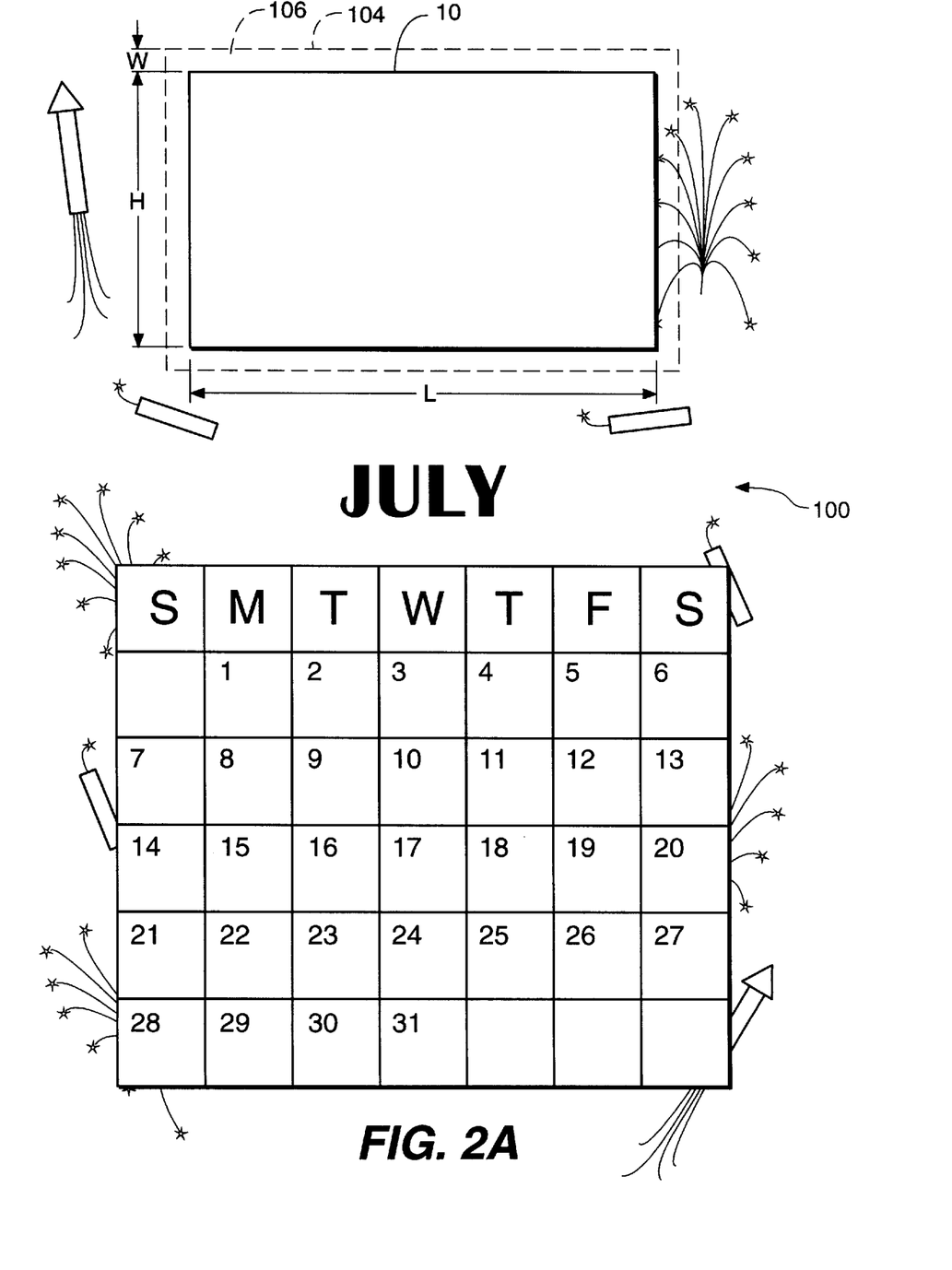
FIG. 2A illustrates an example of a prestored image having a single location of a first predetermined aspect ratio for receiving a customer generated digital image.
Figure 3A:
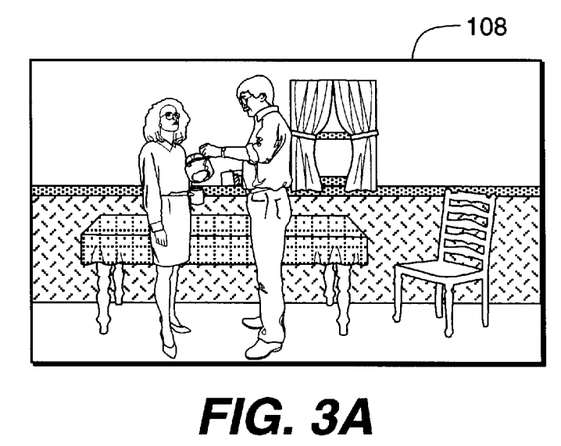
FIGS. 3A, 3B, and 3C are customer generated digital images, each having a predetermined aspect ratio which is to be merged into one of the prestored image of FIGS. 2A, 2B, or 2C.
Figure 3B:
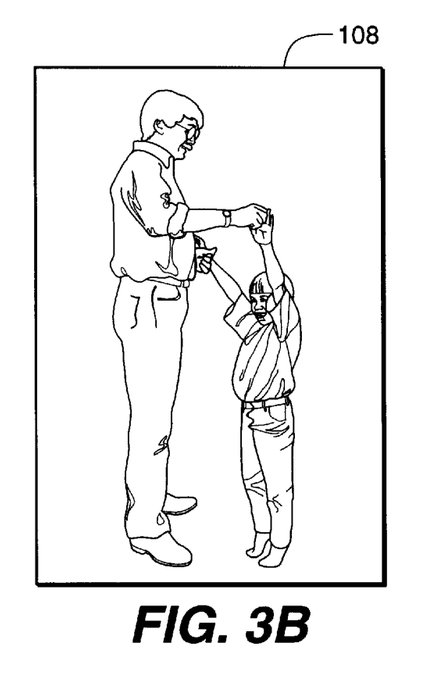
Figure 3C:
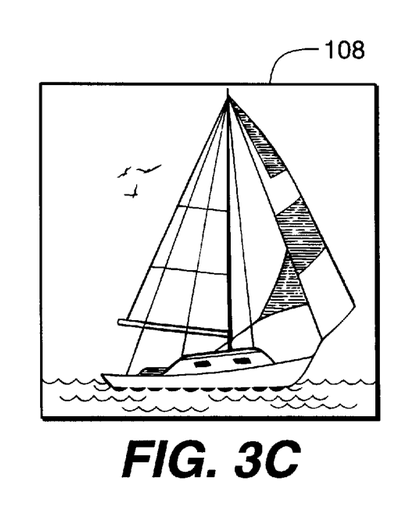
Figure 4A:
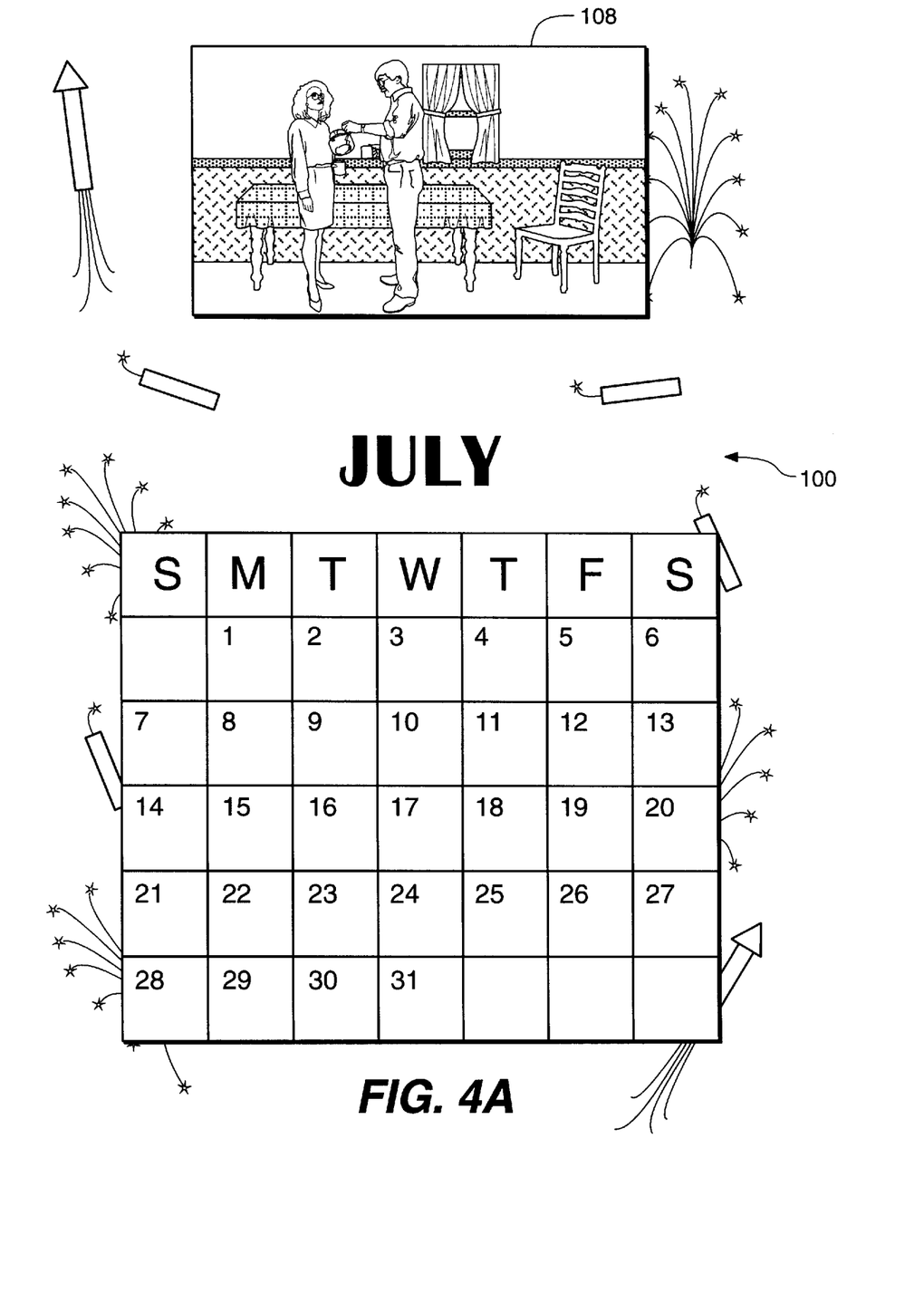
FIG. 4A illustrates the merging of FIG. 3 with FIG. 2A.
Figure 4B:
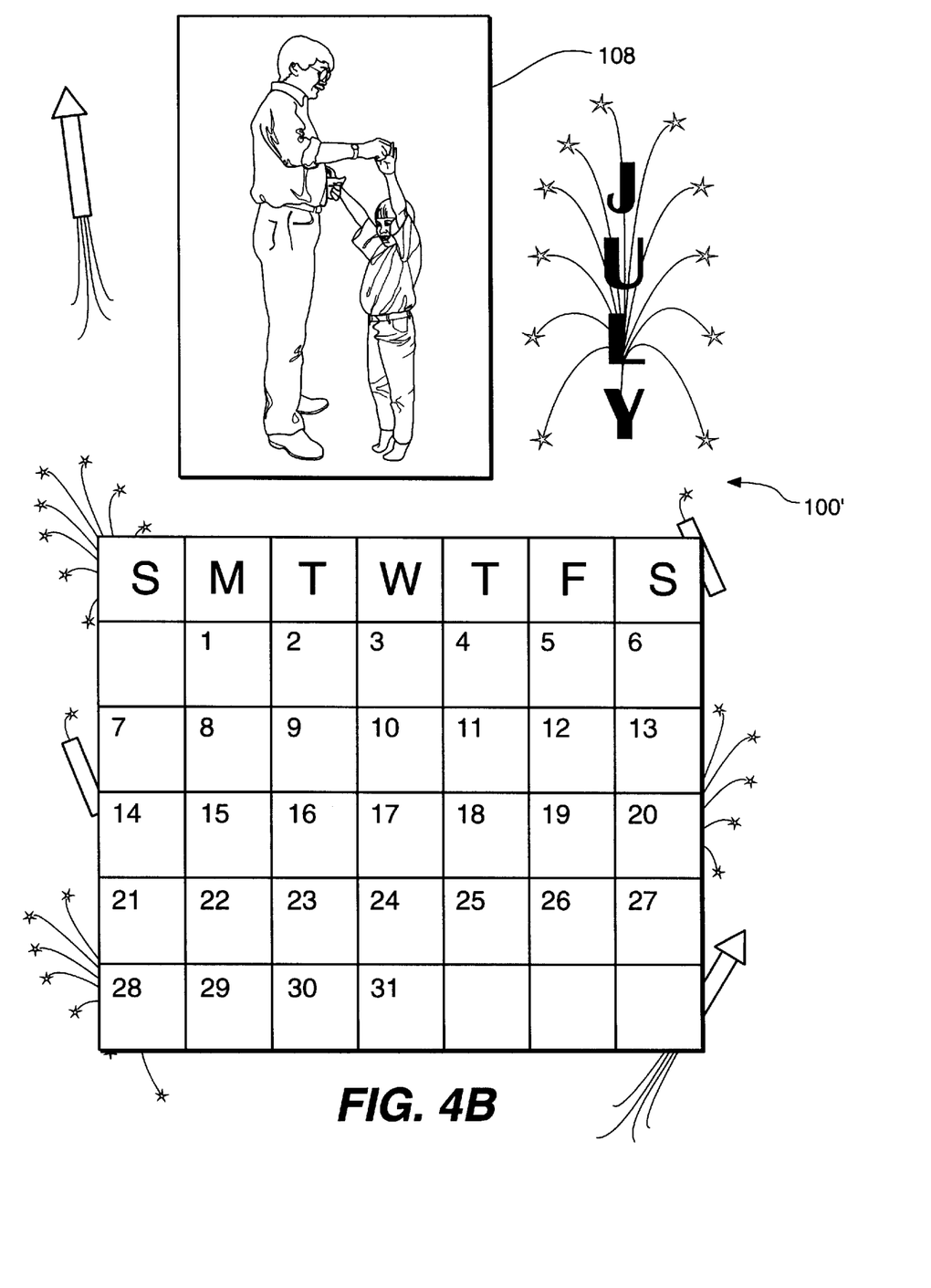
FIG. 4B illustrates the merging of FIG. 3 with FIG. 2B.
Figure 4C:
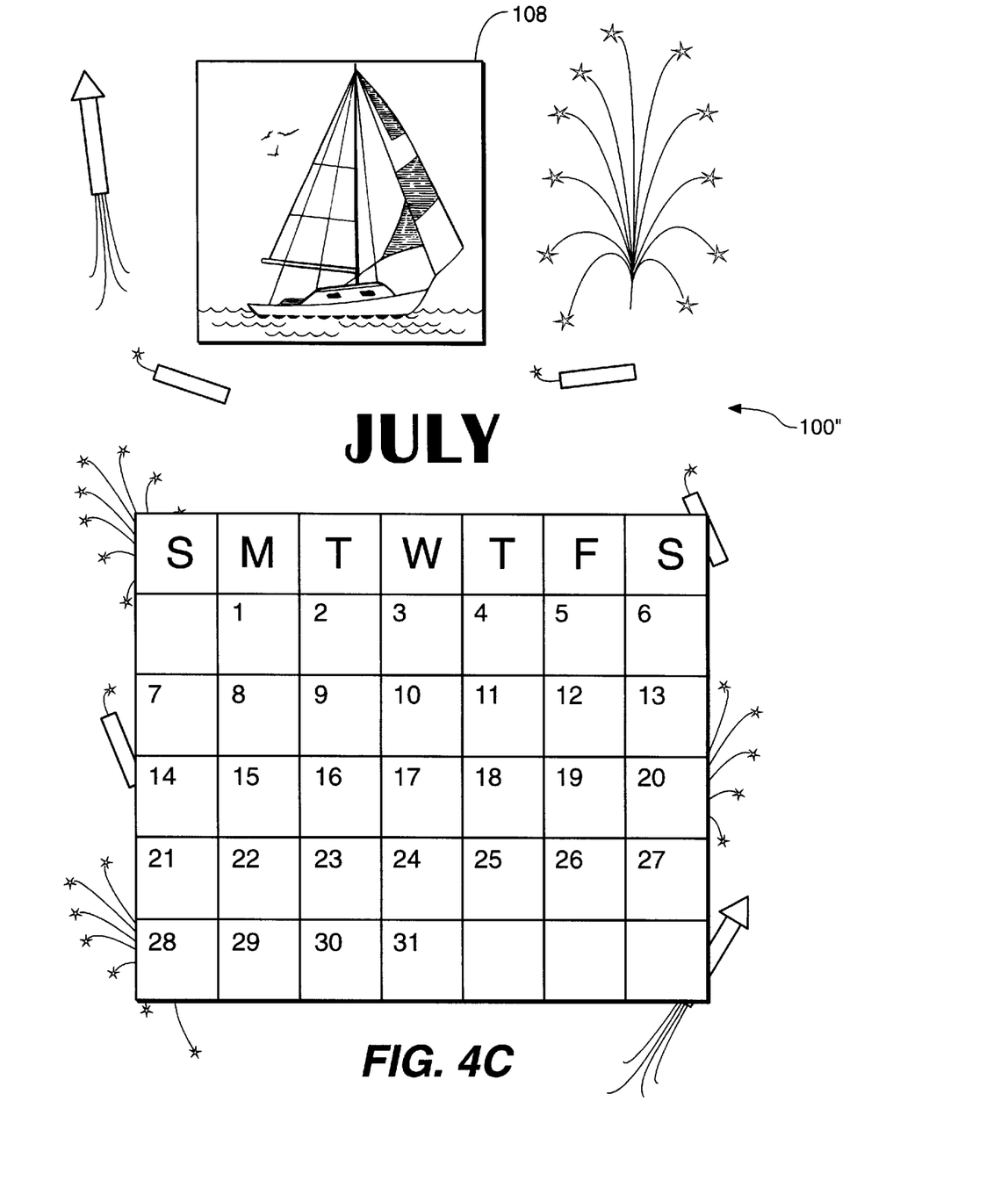
FIG. 4C illustrates the merging of FIG. 3 with FIG. 2C.

Referring to FIG. 2A, there is illustrated a digital prestored image 100 that has been stored in the memory of CPU 10. The prestored image 100 has at least one location 102 of a first predetermined aspect ratio where a selected customer generated digital image 108 (see FIGS. 3A, 3B and 3C) can be placed. For the purpose of the present invention, the aspect ratio of location 102 shall be considered the ratio of the length L of the location 102 in relationship to the height H of the location 102. In the embodiment illustrated, location 102 has a length L of 5 inches (12.7 cm) and a height H of 3 inches (7.62 cm) and thus provides an aspect ratio of 5:3. The size and aspect ratio of location 102 is selected so as not to interfere with the aesthetic characteristics of the image 100. It is recognized that sometimes it is required to combine a customer generated image having a different aspect ratio than that provided by location 102 in prestored image 100. If the customer generated image 108 has a substantially different aspect ratio, it may be necessary to manually adjust the prestored image 100, or customer generated image 108 (see FIGS. 3A, 3B, and 3C). However, this can result in substantially detracting from the visual effect of the prestored image 100, especially if a significant portion around the location 102 is removed and replaced by the customer generated image 108.

Figure 2B:
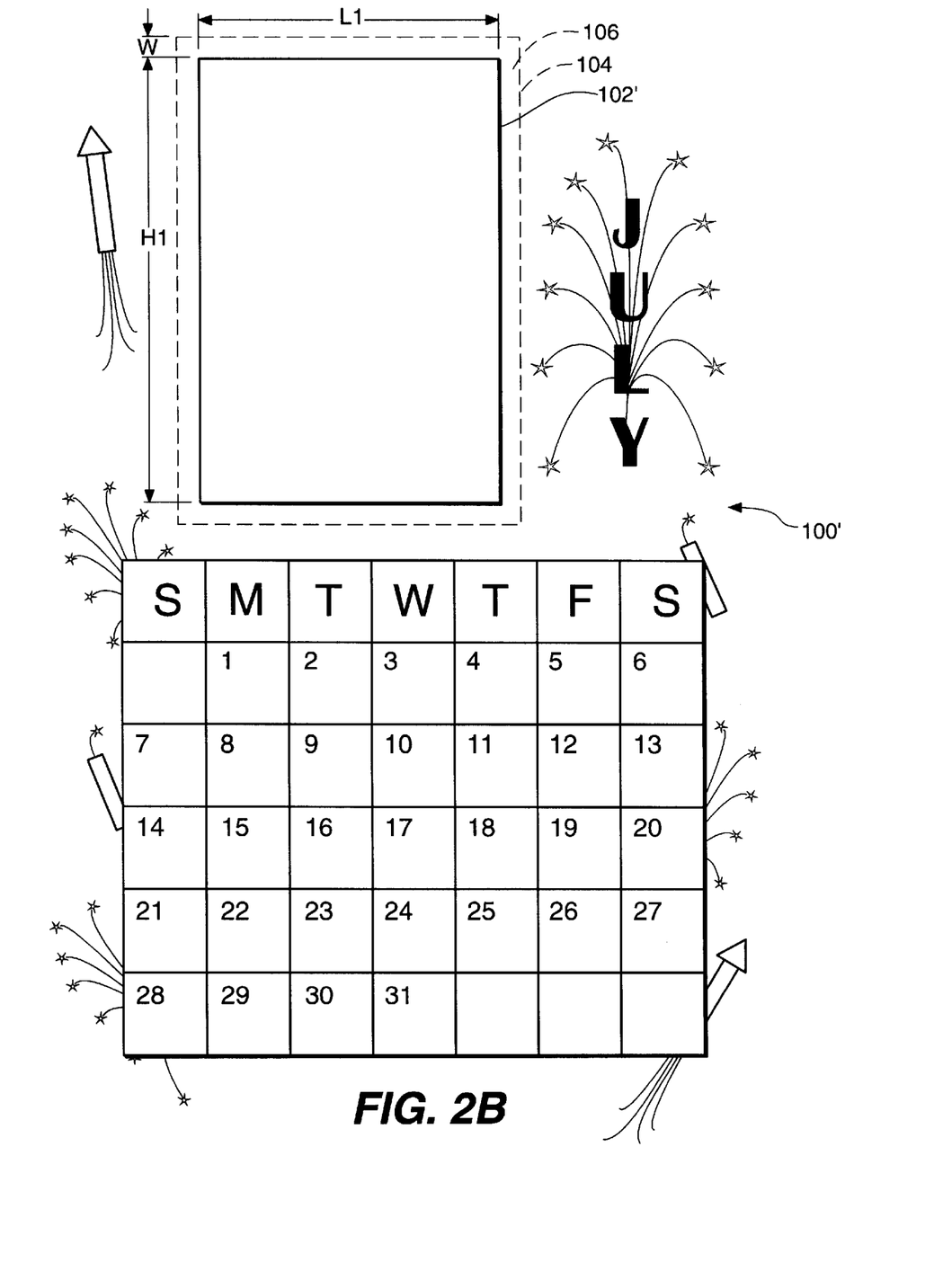
FIG. 2B illustrates an example of a prestored image having a single location of a second predetermined aspect ratio for receiving a customer generated digital image.

In order to avoid this problem, the prestored image 100 may be provided in a plurality of substantially identical images, each having a location 102 of a different aspect ratio. Referring to FIG. 2B, there is illustrated a prestored image 100' which is substantially identical to image 100, having a location 102' having a predetermined aspect ratio different from image 100. In particular, location 102' has a length L1 of 6 inches (15.24 cm) and a height H1 of 4 inches (10.16 cm), providing an aspect ratio of 3:2. As can be seen, the image 100' has been slightly modified in the area around location 102' with respect to the same area in image 100. This has been done to retain the artistic effect of the image 100'.

Figure 2C:
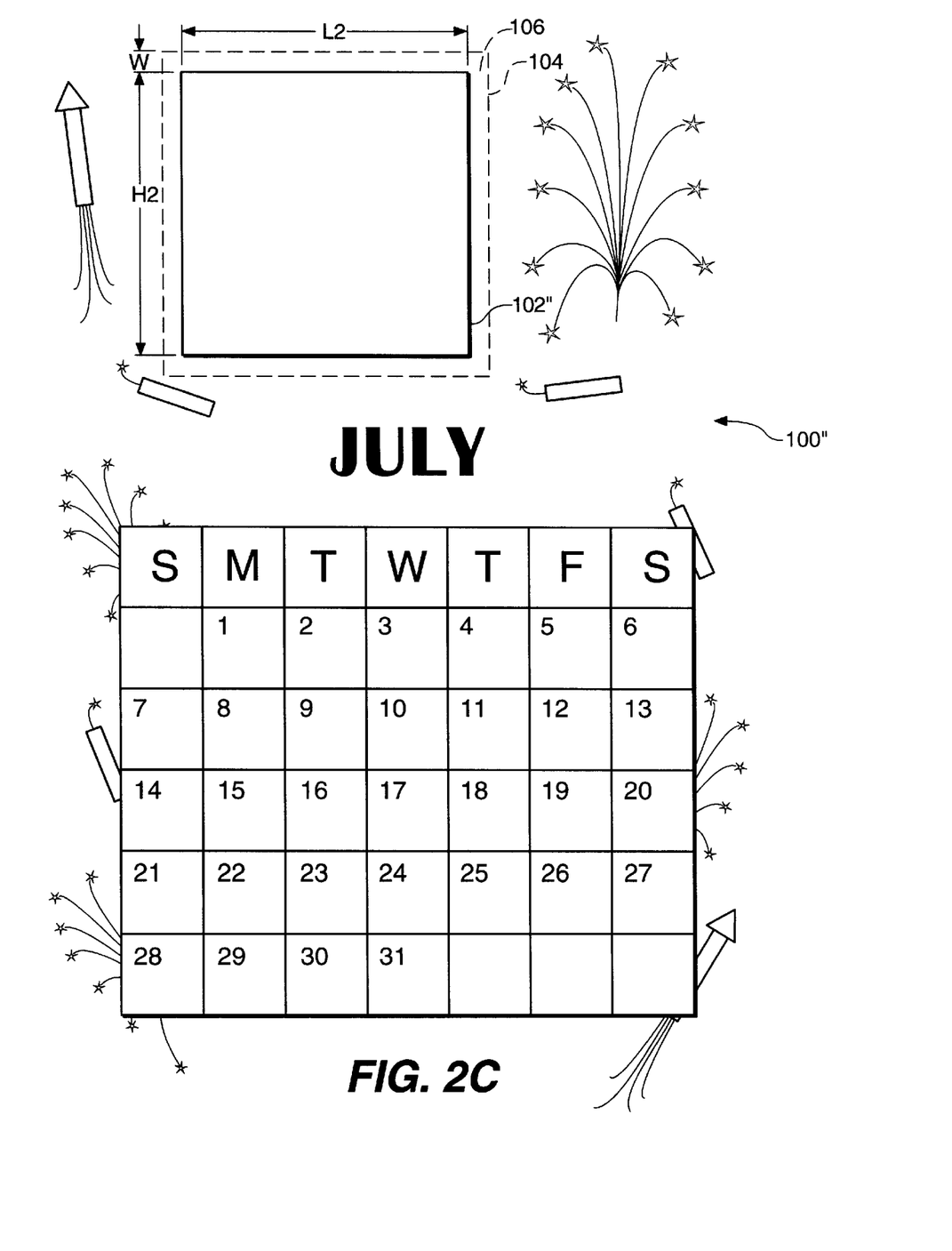
FIG. 2C illustrates an example of a prestored image having a single location of a third predetermined aspect ratio for receiving a customer generated digital image.

Referring to FIG. 2C, there is illustrated yet another modified prestored image 100" having a substantially identical image to image 100 and having a location 102" having a third size aspect ratio. In particular, location 102" has a length L2 of 5 inches (12.7 cm) and a height H2 of 5 inches (12.7 cm), thus providing aspect ratio of 1. The image 100" has again been slightly modified so as to retain the desired artistic effect.

It is to be understood that any desired number of substantially identical, similar or different images 100 may be provided, each having a different aspect ratio location, thus allowing to retain the artistic quality of the prestored image when presented with customer images of different aspect ratios.

In addition to providing different size locations 102, each of the locations may be provided with a restricted zone around the location so as to allow small adjustments to the location without substantially affecting the visual effect of the prestored image 100. Referring back to FIG. 2A, there is illustrated by dash line 104, a buffer zone 106 surrounding location 102. Buffer zone 106 has a width W which may be the same or different in the direction of the length L or height H. Buffer zone 106 provides an area surrounding location 102 which can be removed without affecting the visual effect of image 100. Generally, the width W is such that it does not change the size of length L or height H by more than 20%, preferably by no more than 10%. In the embodiment illustrated, the width W of zone 106 is about 10% of the length L and height H.

In the preferred embodiment, the buffer zone 106 is provided around location 102, 102', 102", however, the buffer zone 106 may be provided internally to the periphery of location 102, 102' and 102" such that the location 102, 102', 102" will be made a smaller size so that the location 102, 102', 102" has the corresponding aspect ratio. In such case, the pattern and/or color of the area immediately adjacent is simply repeated. Alternatively, a prestored image may be provided. The same size reductions apply as did for the increase in size of location 102, 102', 102". That is, the reduction is preferably less than 20% in the length L and height H, and most preferably, less than 10% of the length L and height H of the location 102, 102', 102".

Figure 5A:
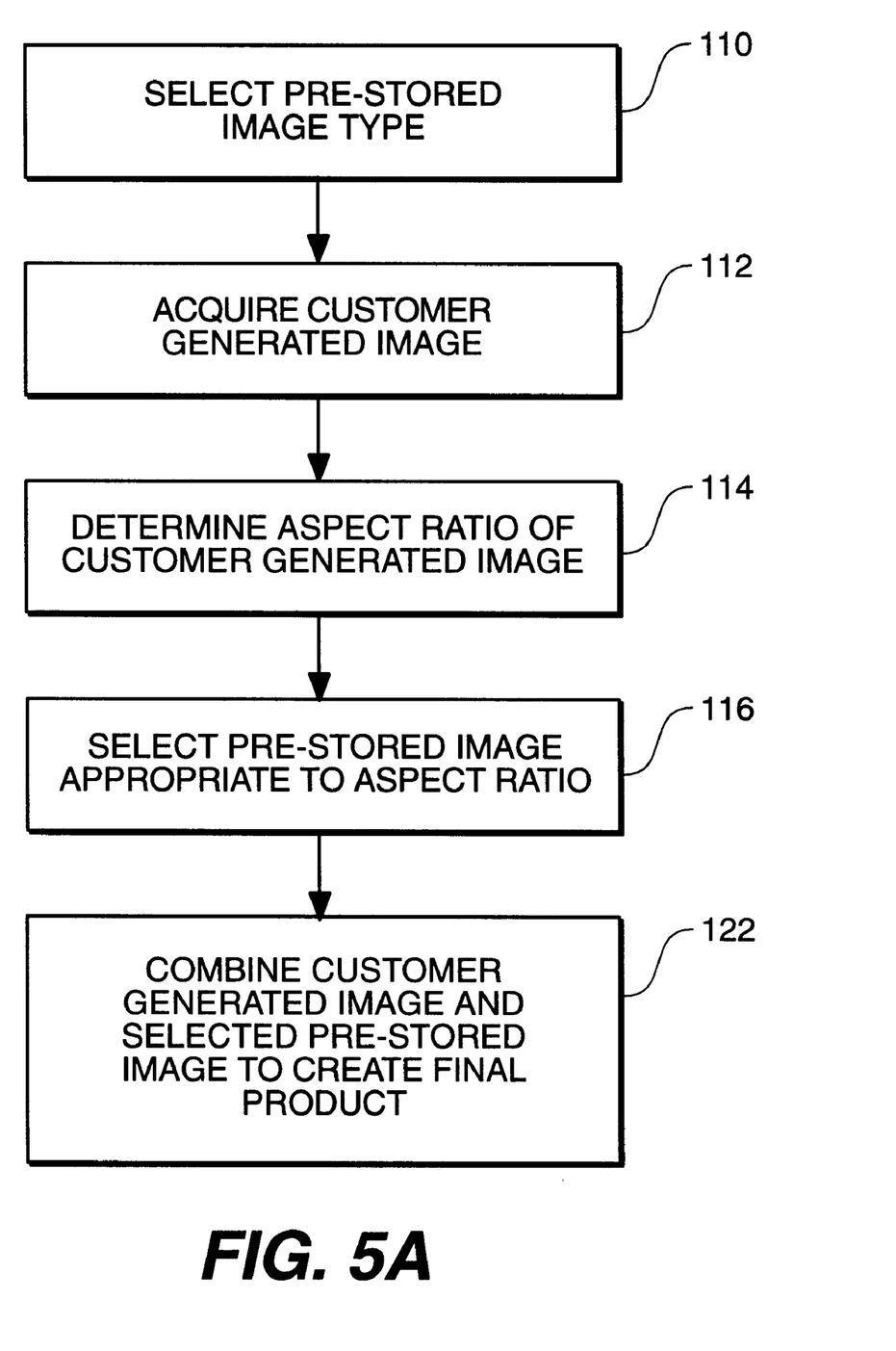
FIGS. 5A and 5B are flow charts illustrating the method according to the present invention.
Figure 5B:
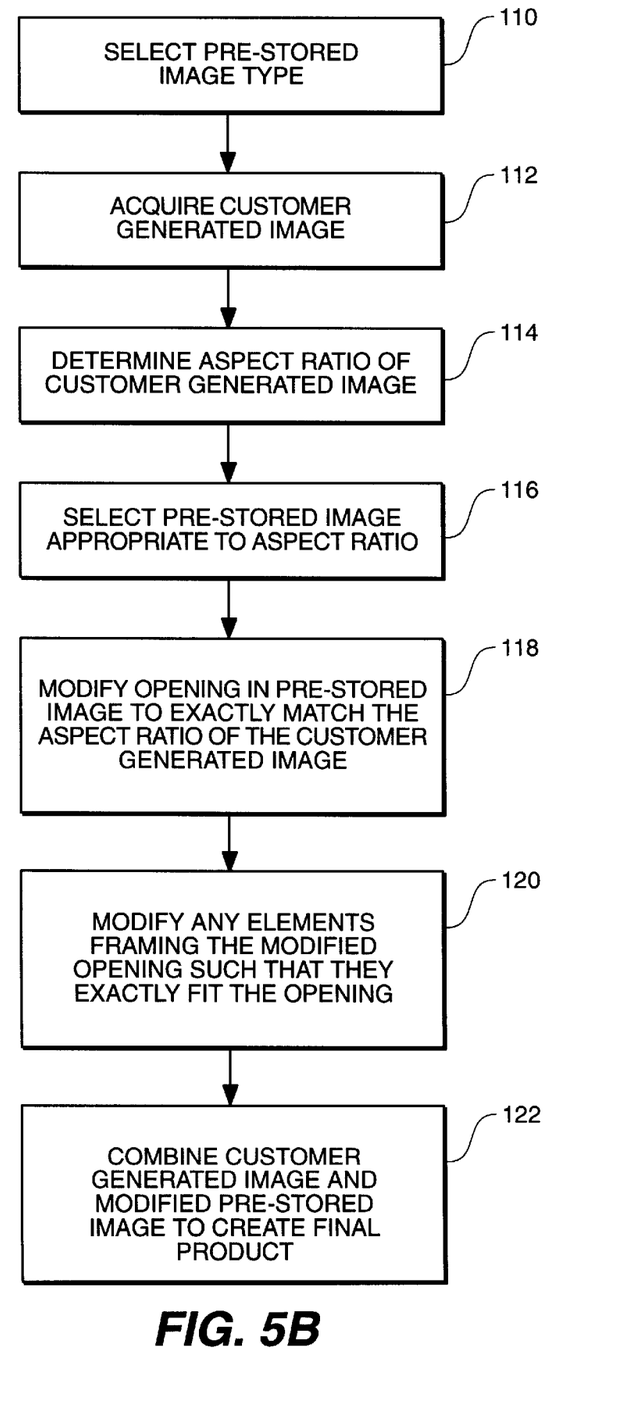

In order to more clearly understand the present invention, a description of its operation will now be discussed with reference to the flow chart illustrated in FIGS. 5A and 5B. First, a customer selects a particular theme or image 100 in which a customer generated digital image is to be merged as indicated by box 110. The customer then provides a customer generated digital image 108 at box 112. The desired aspect ratio is selected by the specified image area to be used. The customer generated digital image 108 may be obtained by any of the input devices 12,14,16,18,20,22, or any other input desired. In the embodiment illustrated, the prestored imaged is selected first, however, the customer generated image 108 may be obtained first. The central processing unit (CPU) 10 at box 114 automatically determines the aspect ratio of the customer generated image 108. Based on this determination by CPU 10, the CPU at box 116 will automatically select the prestored image having a location which corresponds or is closest to the aspect ratio of the customer generated image 108. If the location 102 of the selected prestored image does not correspond exactly, then the buffer zone 106 surrounding the location 102 will be modified, as indicated by box 118 (see FIG. 5A), so that the aspect ratio of the location 102 will correspond to that of the customer generated image 108 so long as it is within the predetermined zone 106. If appropriate, the image area around or in location 102 is provided with appropriate image elements to fill any void area as illustrated by box 120 in FIG. 5A. Once this has been done, the prestored image 100 and the customer generated image 108 are merged so as to produce a new merged image. This merged image is then sent to an appropriate output device at box 122 where the image is printed on the desired medium, stored electronically for later retrieval and use, or transmitted to another computer or location for further use.

As can be seen, the present invention provides a method and system for automatically selecting and/or modifying a prestored image such that a customer generated digital image can be merged quickly and economically without interfering with the desired artistic or aesthetic values of the prestored image.

It is to be understood that various other changes and modifications may be made without departing form the scope of the present invention, the present invention being limited by the following claims.

TABLE I

PARTS LIST

| | |
|---|---|
| 10 | central processing unit |
| 11,13 | data link system |
| 12,14,16,18,20,22 | input devices |
| 32,34,36,38,40,42 | output devices |
| 44 | server |
| 100,100',100" | prestored image |
| 102,102',102" | location |
| 104 | dash line |
| 106 | buffer zone |
| 108 | customer generated image |
| 110,112,114,116,118,120,122 | boxes |

What is claimed is:

1. A method of combining at least one captured generated digital image with a prestored digital image, comprising the steps of:

a) providing a customer generated image in digital form;

b) automatically determining the aspect ratio of said customer generated digital image;

c) providing a plurality of prestored digital images, each having a predetermined location wherein said customer generated digital image may be placed, said location of each of said plurality of prestored digital images having a different predetermined aspect ratio; and d) automatically selecting one of said prestored digital images wherein the location has an aspect ratio closest in size to the aspect ratio of said customer generated digital image.

2. A method according to claim 1 further comprising the steps of:

e) providing at least one output means for printing, displaying, transmitting, or storing of an image;

f) merging the selected prestored image and said customer generated image so as to produce a merged digital image; and g) forwarding said merged image to said output means.

3. A method according to claim 2 wherein the location of said selected prestored image has a buffer zone surrounding said location.

4. A method according to claim 3 wherein said location has a length L and a height H and said buffer zone has a width W, said width being not greater than 20% of said length L or said width W, further comprising the step of modifying said location in said buffer zone so that said location corresponds to said aspect ratio of said customer generated image.

5. A method according to claim 3 wherein said location has a length L and a height H and said buffer zone has a width W, said width being not greater than 10% of said length L or said width W, further comprising the step of modifying said location in said buffer zone so that said location corresponds to said aspect ratio of said customer generated image.

6. A method of combining at least one captured generated digital image with a prestored digital image, comprising the steps of:
   a) selecting a prestored digital image, said prestored digital image having a predetermined location of a first predetermined aspect ratio wherein a captured generated digital image may be placed, said prestored image having a buffer zone around said location that can be removed in order to accommodate a customer generated image having an aspect ratio greater than said predetermined aspect ratio;
   b) providing a customer generated image of a second predetermined aspect ratio different from said first predetermined aspect ratio of said location; and
   c) modifying said location by removing a portion of said buffer zone such that the first aspect ratio of location corresponds to the second aspect ratio of said customer generated digital image.

7. A method according to claim 6 further comprising the steps of:
   d) providing at least one capture means for obtaining said customer generated image in digital form;
   e) providing at least one output means for printing, displaying, transmitting, or storing of an image;
   f) automatically modifying the aspect ratio of said location so as to correspond to the aspect ratio of said customer generated image;
   g) combining the modified prestored digital image with said customer generated image so as to form a merged digital image; and
   h) forwarding said merged image to an output device.

8. A method according to claim 7 wherein the location of said selected prestored image has a buffer zone surrounding said location.

9. A method according to claim 8 wherein said location has a length L and a height H and said buffer zone has a width W, said width being not greater than 20% of said length L or said width W, further comprising the step of modifying said location in said buffer zone so that said location corresponds to said aspect ratio of said customer generated image.

10. A method according to claim 8 wherein said location has a length L and a height H and said buffer zone has a width W, said width being not greater than 10% of said length L or said width W, further comprising the step of modifying said location in said buffer zone so that said location corresponds to said aspect ratio of said customer generated image.

11. A method of combining at least one captured generated digital image with a prestored digital image, comprising the steps of:
   a) providing a customer generated digital image;
   b) automatically determining the aspect ratio of said selected customer generated digital image;
   c) automatically selecting a prestored digital image based on the aspect ratio of said customer generated image, said prestored digital image having a predetermined location of a predetermined aspect ratio wherein the customer generated digital image may be placed, said prestored image having a buffer area around said location that can be removed in order to accommodate said customer generated image; and
   d) automatically modifying said buffer area so that the location of the selected prestored digital image corresponds to the aspect ratio of said selected customer generated image.

12. The method according to claim 11 further comprising the steps of:
   e) providing at least one output means for printing, displaying, transmitting, or storing of an image;
   f) merging the selected prestored image and said customer generated image so as to produce a merged digital image; and
   g) forwarding said merged image to said output means.

13. A method according to claim 11 wherein said location of said selected prestored image is modified by removing a portion of said buffer zone.

14. A method of combining at least one captured generated digital image with a prestored digital image, comprising the steps of:
   a) providing a customer generated image in digital form;
   b) automatically determining the aspect ratio of said selected customer generated image;
   c) providing a plurality of substantially identical prestored digital images, said plurality of prestored digital images each having a predetermined location wherein said customer generated digital image may be placed, said location of each of said plurality of prestored digital images having a different predetermined aspect ratio; and
   d) automatically selecting one of said prestored digital images wherein the location has an aspect ratio closest in size to the aspect ratio of said selected customer generated image.

15. The method according to claim 14 further comprising the steps of:
   e) providing at least one output means for printing, displaying, transmitting, or storing of an image;
   f) merging the selected prestored image and said customer generated image so as to produce a merged digital image; and
   g) forwarding said merged image to said output means.

16. A method according to claim 15 wherein the location of said selected prestored image has a buffer zone surrounding said location.

17. A method according to claim 16 wherein said location has a length L and a height H and said buffer zone has a width W, said width being not greater than 20% of said length L or said width W, further comprising the step of modifying said location in said buffer zone so that said location corresponds to said aspect ratio of said customer generated image.

18. A method according to claim 16 wherein said location has a length L and a height H and said buffer zone has a width W, said width being not greater than 10% of said length L or said width W, further comprising the step of modifying said location in said buffer zone so that said location corresponds to said aspect ratio of said customer generated image.

* * * * *